United States Patent Office 3,657,173
Patented Apr. 18, 1972

3,657,173
OIL AND WATER REPELLENT COMPOSITIONS
Albert R. Eanzel, Brussels, Belgium, and John Preston, Wiggin, England, assignors to E. I. du Pont de Nemours and Company, Wilmington, Del.
No Drawing. Filed Mar. 3, 1970, Ser. No. 16,253
Int. Cl. C08f 45/24
U.S. Cl. 260—29.6 F          8 Claims

ABSTRACT OF THE DISCLOSURE

A composition which is in the form of an emulsion or which can readily be converted into an emulsion on shaking, suitable for imparting oil and/or water repellency to an article which comprises a fluorine-containing polymer having oil and/or water repellency properties, a major amount of a halogenated solvent which is perchloroethylene, trichloroethylene, 1,1,2-trichloro-1,2,2-trifluoroethane, carbon tetrachloride, methylene chloride, methyl chloroform, monochlorobenzene, ortho-dichlorobenzene, 1,1,2,2-tetrachloro-1,2-difluoroethane or 1,1,1-trichloro-2,2,3,3,3-pentafluoropropane; a minor amount of an alkanol of 1 to 5 carbon atoms, and water.

BACKGROUND OF THE INVENTION (1) Field of the invention

This invention relates to compositions suitable for imparting oil and water-repellency properties to an article.

(2) Description of the prior art

It is known to impart oil- and water-repellency properties to articles using fluorine-containing polymers, such as those described in British specification No. 1,011,612 or 1,058,955. According to these British specifications, polymer mixtures are employed in the form of aqueous latexes or solvent solutions which are applied to fabrics and then cured to impart the desired repellency properties.

SUMMARY OF THE INVENTION

According to the present invention, there is provided a composition which is in the form of an emulsion or which can readily be converted into an emulsion on shaking, suitable for imparting oil and/or water repellency to an article which comprises a fluorine-containing polymer having oil and/or water repellency properties, a major amount of a halogenated solvent which is perchloroethylene, trichloroethylene, 1,1,2-trichloro-1,2,2-trifluoroethane, carbon tetrachloride, methylene chloride, methyl chloroform, monochlorobenzene, ortho-dichlorobenzene, 1,1,2,2-tetrachloro-1,2-difluoroethane or 1,1,1-trichloro-2,2,3,3,3-pentafluoropropane; a minor amount of an alkanol of 1 to 5 carbon atoms, and water.

DESCRIPTION

We have found that by using such emulsions, the efficiency of the fabric treating process, in terms of the amount of polymer deposit needed to effect a given degree of repellency, is generally improved as compared with solutions or aqueous latexes used heretofore. Although the reasons for such improved efficiency are not fully understood, it appears to result from the fact that a greater percentage of the polymer deposit is retained on the surface of the fabric, rather than within the fabric, so that more of the polymer is readily available for repelling water or oil.

A further advantage of the present invention is that the halogenated solvents used in the compositions of the present invention are well known dry-cleaning solvents so that it is fully practical to use conventional dry-cleaning equipment to render a fabric or garment repellent to stains.

Suitably, an emulsion concentrate is normally first formed by high shear agitation of a mixture of the alkanol, halogenated diluent, and an aqueous latex of the polymer mixture, as will be described hereinafter. Preferably, the alcohol is added to the halogenated solvent and then the water emulsion of the polymer added while vigorously agitating the mixture. In this form the emulsion concentrate is normally storage-stable. Where some phase separation occurs over lengthy periods of time, a brief stirring or shaking action will generally quickly result in a homogeneous emulsion. The percentage of each of alkanol, water, and polymer in the concentrate is usually relatively small compared to the percentage of halogenated diluent. The amount of polymer is not usually in excess of 30% by weight and the amount of water is also preferably kept at a low level so as to avoid excessive shrinkage of fabrics that may subsequently be treated.

In general the compositions of this invention contain 0.01% to 30% (preferably 4–25%) by weight of the fluorine-containing water and oil repellent polymer. Alternatively, the 0.01% to 30% can be composed of the fluorine-containing polymer and a nonfluorinated extender polymer (described below). The compositions will also contain 50% to 99.97% of the halogenated solvents (preferably 60–80%); 0.01% to 30% by weight water (preferably 6–25%), and 0.01% to 49% of a $C_1$ to $C_5$ alcohol adjuvant (preferably 1–15%); the total percent being 100%. The ratio of water to polymer solids will generally be 1/1 to 5/1.

For use in imparting oil and water-repellent properties to textile fabrics or other materials, the emulsion concentrate may be mixed with additional halogenated diluent. In this form the resulting emulsion may contain, for example, from 0.01 to 1% by weight of polymer solids, from 0.01 to 6% by weight of water, and from 0.01 to 6% by weight of alkanol, the remainder being halogenated diluent. The upper limits of alkanol and water are not particularly critical so long as the amounts of each are insufficient to impair the qualities of the fabric or other material to be treated.

The alkanols used in the compositions of this invention are those containing 1 to 5 carbons, for example methanol, ethanol, propyl, isopropyl, butyl and pentyl alcohol. The preferred alcohol is isopropyl alcohol. Mixtures of alkanols can be employed and it is also possible to use combinations of two or more diluents. Other conventional modifiers, e.g. fabric modifiers, crease resistance agents, wetting agents, water-repellent agents, antistatic agents and resin finishes can also be added to the compositions as desired.

As the fluorine-containing oil and water repellent polymers employed in the compositions of this invention those described in British specification No. 1,011,612 or U.S. Pat. 3,378,609 are preferred. The fluorine-containing polymer can be either a homopolymer having units derived from at least one polymerizable monomer of the formula

$$C_nF_{2n+1}CH_2CHO_2CC(CH_3)=CH_2$$

in which $n$ is an integer from 3 to 14. Preferably the units are derived from a mixture of such monomers where $n$ is 6, 8 and 10 in the approximate weight ratio of 3:2:1, and 12 and 14 in amounts of less than 10% by weight.

Preferably however, the fluorine-containing polymer will be a copolymer of the above-described monomer and a polymerizable monovinyl compound free of non-vinylic fluorine or a non-fluornated conjugated diene. The polymerizable monovinyl compounds free of non-vinylic fluorine which may be used include alkyl acrylates and methacrylates, vinyl esters of aliphatic acids, styrene and alkyl styrene, vinyl halides, vinylidene halides, allyl esters, vinyl alkyl ketones, and acrylamides. The non-fluorinated conjugated dienes are preferably 1,3-butadienes. Representative compounds within the preceding class include the methyl, propyl, butyl, 2-hydroxypropyl, 2-hydroxyethyl, isoaryl, 2-ethylhexyl, octyl, decyl, lauryl, cetyl, octadecyl; vinyl acetate, vinyl propionate vinyl capyrylate, vinyl laurate, vinyl stearate, styrene, α-methylstyrene, p-methylstyrene, vinyl fluoride, vinyl chloride, vinyl bromide, vinylidene fluoride, vinylidene chloride, allyl heptanoate, allyl acetate, allyl caprylate, ally caproate, vinyl methyl ketone, vinyl ethyl ketone, 1,3-butadiene, 2-chloro-1,3-butadiene, 2,3 - dichloro - 1,3-butadiene, isoprene, N-methylolacrylamide, N-methylolmethacrylamide, glycidyl acrylate, and glycidyl methacrylate.

Frequently, the above-described fluorine-containing oil and water repellent homopolymers anl copolymers are mixed with non-fluorine-containing polymers called "extender" polymers, and the term "polymer solids" as used herein will refer to the total polymer present in the compositions of this invention. These extender polymers are polymers of polymerizable monovinyl compounds free of non-vinyl fluorine or non-fluorinated conjugatel dienes. In other words, these extender polymers are made up of units derived from the same monomers that can be used to prepare copolymers containing units of the fluorine-containing $C_nF_{2n+1}CH_2CH_2O_2CC(CH_3)=CH_2$ monomer. Thus the disclosure of classes and specific compounds of such monomers above applies to these extender polymers and such disclosure will not be repeated here.

Preferred monomers for use as the monovinyl compounds free of non-vinylic fluorine both in units of the copolymers of the fluorine-containing monomer and in the extender polymers include $$RCH(OH)CH_2O_2CC(R')=CH_2$$

wherein R and R' are each hydrogen or methyl (i.e., 2-hydroxyethyl- or 2-hydroxypropyl-acrylate or methacrylate); and alkyl acrylates or methacrylates especially n-lauryl methacrylate or 2-ethylhexyl methacrylate. It is also advantageous to include in all these polymers a small amount of units derived from N-methylolacrylamide or N-methylolmethacrylamide and glycidyl acrylate or glycidyl methacrylate to improve durability of the polymer solids to laundering or dry cleaning. A preferred extender polymer is one containing 98% by weight units derived from 2-ethylhexylmethacrylate and 2% by weight units derived from N-methylolacrylamide.

In the fluorine-containing copolymer units derived from the fluorine-containing monomer can range from 3 to 95% of the total weight. When the fluorine-containing copolymer is mixed with an extender polymer, the polymer solids should contain from about 3 to 60% of the weight of the polymer solids of units derived from the fluorine-containing monomer.

Specific fluorine-containing copolymers useful in the compositions of this invention include:

(a) 55-70% by weight:

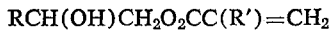

29-45% by weight lauryl methacrylate (an alkyl methacrylate of predominately 12 alkyl carbons.
0.1-0.5% by weight 2-hydroxyethyl acrylate or methacrylate (preferably the methacrylate)
0-0.5% by weight N-methylol acrylamide or methacrylamide (preferably acrylamide).

This fluorinated copolymer can be used alone in the compositions of this invention or can be mixed with one of the above-describel extender polymers, provided that when so mixed the weight of units derived from the

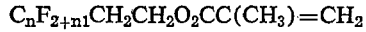

comprise 3–60% of the weight of polymer solids.

(b) 70-95% by weight:

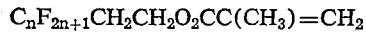

5-30% by weight 2-ethylhexyl methacrylate
0.1-1% 2-hydroxyethyl acrylate or methacrylate (preferably the methacrylate)
0-0.5% N-methylolacrylamide This fluorinated copolymer can be used alone in the compositions of this invention or can be mixed with one of the above-described extender polymers, provided that when so mixed the weight of units derived from the

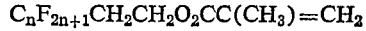

comprise 3–60% of the weight of polymer solids.

In addition these polymer solids may be combined with about 1.5% of the total solids weight of a compound of the structure

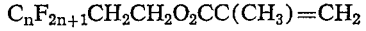

where x and y are at least 1. These compounds are described in U.S. Pat. 3,438,925.

Also useful as the fluorinated polymer are any of the foregoing described polymers in which the units derived from the fluorinated monomer are derived from the monomer $C_nF_{2n+1}CH_2O_2CCH=CH_2$.

The polymers which comprise the preferred mixture used in the compositions may be formed by separate polymerizations, generally by emulsion polymerization techniques. The latexes of the fluorine-containing polymer and non-fluorine containing polymer are then mixed together in the desired proportions. In general, the polymers may be prepared by any of the known techniques for emulsion polymerization of vinyl compounds. The process may be carried out in a reaction vessel fitted with a stirrer and external means of either heating or cooling the charge. The monomer or monomers to be polymerized together is emulsified in an aqueous solution of a surface active agent to a given emulsion concentration of, for example, from 5% to 50%. Usually, the temperature is raised to between 40° C. and 70° C. to effect polymerization in the presence of an added catalyst, such as sodium peroxide or 2,2'-azodiisobutyronitrile or other catalysts for initiating the polymerization of an ethylenically unsaturated compound.

Other preferred fluorine-containing polymers for use in the compositions of the present invention are the polymeric fluorocarbon acrylate or methacrylate esters of the type described in U.S. Patent 2,803,615. These homopolymers and copolymers with ethylenically unsaturated polymerizable monomers contain polymerized units derived from an acrylate ester of the formula

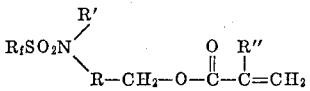

in which $R_f$ is a perfluoroalkyl group containing 4 to 12 carbon atoms, R is an alkylene group containing 1 to 12 carbon atoms, R' is an alkyl group containing 1–6 carbon atoms and R'' is hydrogen or a methyl group. The homopolymer of the acrylate ester of N-propyl, N-ethanol perfluorooctanesulphonamide is typical. When in copolymer form, the second monomer is selected from ethylenically unsaturated polymerizable monomers such as maleic anhydride, acrylonitrile, vinyl acetate, vinyl chloride, styrene, methyl acrylate, methyl methacrylate, ethylene, isoprene or butadiene.

In obtaining mixtures of the fluorine-containing polymer and the extender polymer, the polymers are prepared separately, usually by aqueous emulsion techniques, and are then either added to each other or are added separately during the preparation of the compositions of this invention. In preparing the compositions of this invention, high shear mixers such as Waring or Osterizer blenders or Morehouse-Cowles high speed disk mixers can be employed. Mixing can take place at ambient temperatures, preferably room temperatures, e.g. 20–30° C. When mixing in the two polymers separately, the aqueous emulsion of the extender polymer is usually added first, followed by the aqueous emulsion of the fluorine-containing polymer, both at a fairly rapid rate.

The present invention also provides a method of treating an article so as to render it oil and/or water repellent which comprises applying thereto a composition of emulsion concentrate of the present invention which has been diluted with additional halogenated solvent as described above.

Suitable substrates include not only fabrics and garments but also filaments, fibers, yarns and other articles formed of natural, modified natural, or synthetic polymeric materials or from blends of these and other fibrous materials. Paper, leather and other materials can also be treated. Specific examples are cotton, silk, regenerated cellulose, nylon, fiber-forming linear polyesters, fiber-forming polyacrylonitrile, cellulose nitrate, cellulose acetate, and ethyl cellulose. Dyed and undyed cotton sateen, poplin, broad-cloth, jean cloth and gabardine are especially adaptable for treatment with the compositions of this invention to provide products having a high repellency to oil and water, being relatively unaffected by the action of heat, air and light. Materials rendered oil and water-repellent by the present invention retain a portion of the original repellent even when laundered and dry cleaned.

The compositions may be applied, preferably as an solvent dispersion, by brushing, dipping, spraying, padding, roll-coating or by any combination of these methods. For example, the prepared polymer composition may be used as a pad bath. The textile material is padded in this bath, and is then freed of excess liquid, usually by squeeze rolls, so that the dry pick-up (weight of the dry polymer on fiber) is between 0.05% and 10% by weight of the fiber. The treated material is then heated suitably at 150° C. to 195° C. for at least 15 seconds to impart maximum durability of the agent on the material. The resulting textile material will be found to be resistant to water and/or oil.

As indicated above, the compositions can also be employed during a normal drycleaning operation. The temperature of the drying step, or of a subsequent heating step, should normally be from 61° C. to 71° C. for periods up to 30 minutes, although lower or higher temperatures can often be used depending on the material being treated.

An advantage of this invention lies in its use of aqueous emulsions of oil and water repellent compositions in co-emulsion with dry cleaning type solvents. The aqueous emulsions, sold commercially with about 15% content of polymeric solids, can be used in dry cleaning and other solvent treatment machines in place of currently sold solvent solutions which contain only 5% to 10% of the polymeric solids. In addition stable emulsions can be prepared, as disclosed herein, which contain solvent, water, adjuvant and more than 10% polymeric oil and water repellent agents.

The following examples further illustrate the present invention. Parts are by weight unless otherwise indicated. Example 1 is included to illustrate the preparation of a fluorine-containing polymer mixture. The treated fabric samples of Examples 1 to 3 were tested for water repellency using A.A.T.C.C. Standard Test Method 22–1967 of the American Association of textile Chemists and Colorists. A rating of 100 denotes no water penetration or surface adhesion, a rating of 90 denotes slight random sticking or wetting and so on.

The samples (Examples 1 to 3) were tested for oil repellency using A.A.T.C.C. Standard Test Method 118–1966. In the tests reported herein, clear, undyed oil was used and gradings made 30 seconds after application of oil to treated cloth.

Oil repellency results run from 1–6; 6 being good repellency, 1 being poor.

Home laundering tests were carried out in a Kenmore Washer Model 600 loaded with a 4-lb. load, with 28 g. of Tide detergent. The wash is set at hot (12 min. cycle) and a warm rinse (12 min.). The total washing and rinsing time is 40 minutes. In the home laundering air-dry test, the spun-dry fabrics are dried at ambient temperatures. In the home laundering tumble-dry test, the spun-dry fabrics are dried at 67°–71° C. in a home drier with tumbling.

The dry-cleaning test consists of agitating the sample for 120 minutes in tetrachloroethylene containing 1.5% (weight/volume) of a commercial dry-cleaning detergent (R. R. Street Co., 886 Detergent), extraction of tetrachloroethylene, drying for three minutes at 66° C. In a drum and followed by a 15-second pressing at 149° C. on each side of the fabric.

EXAMPLE 1

A polymer mixture was prepared for use as follows: The fluorinated polymer component was the copolymerization product of:

| | Parts by weight |
|---|---|
| Fluorinated monomer [1] | 1000 |
| n-Butyl acrylate | 20 |
| N-methylolacrylamide (as 60% aqueous solution) | 5 |

[1] $[CH_2=C(CH_3)CO_2CH_2]_nF$ with $n=6$, 8 and 10 in the relative proportions 3:2:1, respectively and also small amounts of $n=12$ and 14.]

The non-fluorinated polymer component was the copolymerization product of:

| | Parts by weight |
|---|---|
| 2-ethylhexyl methacrylate | 1000 |
| N-methylolacrylamide (as 60% aqueous solution) | 18 |

The preparation of both polymers was essentially as described in Example VII of British specification No. 1,011,612 or in U.S. Pat. 3,378,609.

The polymer mixture was prepared by intimately blending aqueous emulsions of the two components to form a composition containing 40% and 60% of fluorinated polymer component and non-fluorinated polymer component, respectively, on a dry solids weight basis. The emulsion mixture was adjusted to contain about 15% of polymer solids for use.

EXAMPLE 2

To a mixing vessel there were charged 20 grams of the aqueous emulsion of the polymer mixture of Example 1, 20 cc. (32.6 grams) of perchloroethylene, and 20 cc. (15.7 grams) of isopropyl alcohol. The ingredients were blended at room temperature with a high shear propellor for a few minutes to produce a stable emulsion containing about 4.4% polymer solids.

For the treatment of fabrics, the emulsion concentrate was diluted further with perchloroethylene to a volume of one liter. In this diluted form the emulsion contained about 0.18% polymer solids. This emulsion was used as a pad bath for a series of fabric samples. In this procedure the fabrics were dipped in the emulsion, passed through a squeeze roll to remove excess liquid, air dried and then cured for 2–3 minutes at 150° C. to impart maximum repellency.

Test fabrics were treated in this manner to deposit 0.225% of polymer solids, based on the fabric weight, with the following results (Table I):

TABLE I

|  | Oil repellency rating | Water repellency rating |
|---|---|---|
| 100% wool fabric: |  |  |
| Initial | 7 |  |
| After 1 washing | 7 |  |
| After 2 washings | 8 |  |
| After 3 washings | 7 |  |
| Polyester/wood fabric: |  |  |
| Initial | 7 | 100 |
| After 1 dry cleaning | 6 | 100 |
| After 2 dry cleanings | 6 | 90 |
| After 3 dry cleanings | 7 | 80 |
| 100% polyester fabric: |  |  |
| Initial | 7 | 100 |
| After 1 washing | 7 | 90 |
| After 2 washings | 7 | 90 |
| After 3 washings | 7 | 80 |
| After 1 dry cleaning | 8 | 80 |
| After 2 dry cleanings | 7 | 80 |
| After 3 dry cleanings | 8 | 80 |
| 100% cotton fabric: |  |  |
| Initial | 7 | 100 |
| After 1 washing | 7 | 80 |
| After 2 washings | 7 | 80 |
| After 3 washings | 7 | 80 |
| After 1 dry cleaning | 8 | 70 |
| After 2 dry cleanings | 7 | 70 |
| After 3 dry cleanings | 8 | 70 |
| Polyester/cotton fabric: |  |  |
| Initial | 7 | 100 |
| After 1 dry cleaning | 7-8 | 80 |
| After 2 dry cleanings | 7 | 70 |
| After 3 dry cleanings | 7 | 70 |

The outstanding oil and water repellency of treated fabrics, even after repeated drycleanings or washings, is apparent above. It is significant that this is achieved at a relatively low level of polymer pick-up.

EXAMPLE 3

The procedure of Example 2 was twice repeated by substituting, respectively, 22 cc. ethanol and 20 cc. of methanol for the same volume of isopropyl alcohol. In each case the results were essentially the same.

EXAMPLE 4

The procedure of Example 2 was repeated, substituting 20 cc. of trichloroethylene for 20 cc. of perchloroethylene in the initial mixing step and increasing the volume of isopropyl alcohol from 22 cc. to 30 cc. The mixture was then made up to 1 liter with trichloroethylene.

The resulting composition imparted a high degree of oil and water repellent properties to fabric samples treated therewith.

EXAMPLE 5

The procedure of Example 2 was repeated, substituting 20 cc. of 1,1,2-trichloro-1,2,2,-trifluoroethane for 20 cc. of perchloroethylene in the initial mixing step and then making up the resultant mixture to 1 liter with 1,1,2-trichloro-1,2,2-trifluoroethane.

The resulting composition imparted a high degree of oil and water repellent properties to fabric samples treated therewith.

EXAMPLE 6

The procedure of Example 2 was repeated, replacing the 20 grams of polymer mixture with 20 grams of the aqueous 25% by weight polymer solids latex sold under the trade name "Scotchgard" FC-208. The resulting emulsion concentrate contained about 7% polymer solids and this was made up to two liters with perchloroethylene.

The resulting composition imparted a high degree of oil and water repellent properties to fabric samples treated therewith.

In the following Examples 7–20 and 31–36, the fluorinated polymer used was that deriving from the monomer mixture 75 parts $C_nF_{2n+1}CH_2CH_2O_2CC(CH_3)=CH_2$ where $n$ is 6, 8, 10 in the weight proportion of about 3:2:1 with small amounts of $n=12$ and 14
25 parts 2-ethylhexylmethacrylate
0.25 part n-methylolacrylamide
0.25 part 2-hydroxyethylmethacrylate Preparation of this polymer and its aqueous emulsion is described in Example 3 (column 7) of U.S. Pat. 3,462,296. The emulsion used contained 25.0% active ingredient polymeric material.

The non-fluorinated extender polymer used in Examples (7–18), 28, 30 and (31–36) was that deriving from the monomer mixture 98 parts 2-ethylhexylmethacrylate
2 parts n-methylolacrylamide The aqueous emulsion used contained 29% active ingredient polymeric material. Preparation of this polymer and aqueous emulsion is described in Example 2 (column 7) of U.S. Pat. 3,462,296 except that the amounts of monomer used were adjusted to the proportions shown above.

EXAMPLES 7–15

Example Nos. 7–15 (Table II) show the relative stability of emulsions prepared with variations in the solvent, the alkanol and the relative amount of fluoropolymer and non-fluoropolymer.

In these and subsequent examples, the halogenated solvent was placed in the bowl of an Osterizer Blender, Model 460 and the alcohol added. The agitator was turned on to high speed. The emulsion of non-fluorinated polymer was added gradually in a steady stream over 10–20 seconds followed by the emulsion of fluoropolymer in the same way. Mixing was continued for 3 minutes, when the agitator was stopped and the resulting emulsion poured into an 8 oz. glass bottle. It was thereafter observed for phase separation at top or bottom at the intervals indicated. All operations were carried out at room temperature.

TABLE II

| Exp. No. | Percent solvent perchloroethylene | Percent adjuvant isopropyl alcohol | Percent extender polymer emulsion non-fluorinated | Percent fluorinated polymer emulsion | Emulsion stability | | |
|---|---|---|---|---|---|---|---|
|  |  |  |  |  | ½ hr. | 24 hrs. | 7 days |
| 7 | 67 | 2 | 12 | 19 | Stable | Stable | Stable. |
| 8 | 67 | 8 | 10 | 15 | do | do | Do. |
| 9 | 67 | 16 | 7 | 10 | do | do | Do. |
| 10 | 60.5 | 14.7 | 10 | 14.8 | do | do | Do. |
| 11 | 75.6 | 9.2 | 5.9 | 9.3 | do | do | Do. |
| 12 | 85.0 | 5.5 | 3.9 | 5.6 | do | do | Do. |
| 13 | 90 | 4 | 2 | 4 | do | do | Do. |
| 14 | 60 | 10 | 7 | 23 | do | do | Do. |
| 15 | 70 | 15 | 10 | 5 | do | do | Do. |

EXAMPLES 16–18

Examples 16–18 (Table III) show the use of different alcohols. The emulsions were prepared as described before for Examples 7–15.

weight of monomers=OWM) was dissolved in 2.37 g. water with agitation. Then 1003.4 g. (66.5% OWM)

$$CH_2=C(CH_3)CO_2CH_2CH_2(CF_2)_nF$$

$n=6$, 8 and 10 in weight ratio 3:2:1 containing less than

TABLE III

| Exp. No. | Percent solvent perchloroethylene | Adjuvant | Percent extender polymer emulsion non-fluorinated | Percent fluorinated polymer emulsion | Emulsion stability ½ hr. | 24 hrs. | 7 days |
|---|---|---|---|---|---|---|---|
| 16 | 67 | 12% 1-butanol | 8 | 13 | Stable | Stable | Stable. |
| 17 | 67 | 12% tert-butyl alcohol | 8 | 13 | do | do | Unstable. |
| 18 | 67 | 12% n-agyl alcohol | 8 | 13 | do | Unstable | Do. |

EXAMPLE 19

This experiment was conducted in the same manner as those proceding, using 67% perchloroethylene, 12–12.5% isopropyl alcohol, 12.5–13.0% of the same fluoropolymer used in the previous examples. The extender polymer used was 8% of an aqueous emulsion containing about 40% of the copolymer deriving from a monomer mixture containing about equal molecular amounts of methyl methacrylate, ethyl methacrylate and acrylic acid. The prepared emulsion was stable at least 7 days.

EXAMPLE 20

This experiment was also conducted in the manner of that preceding but using as the non-fluorinated extender a composition comprising wax, resin and the repellent compound

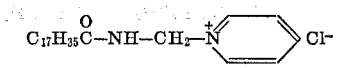

The prepared emulsion of 32% solids was stable at least 7 days.

EXAMPLES 21–26

The following experiments (21–26) were carried out using the polymer emulsions described in the following Table IV. Procedures used are as described for Examples 7–15. A description of the copolymer emulsion (a) through (f) follows the table.

10% $n=12$ and 14, and 497.9 g. (33.0% OWM) of commercial lauryl methacrylate (60% n-dodecyl, 27% n-tetradecyl, 7% lower esters, 6% higher esters, mol. wt. 262) were added and homogenized with the aqueous solution. Water (1650 g.) in a separate container was degassed with nitrogen and boiling, then added to the above monomer dispersion. Dodecyl mercaptan (2.25 g., 0.15% OWM), 6.28 g. (0.25% OWM) of a 60% aqueous solution of N-methylolacrylamide and 3.77 g. (0.25% OWM) of 2-hydroxyethyl methacrylate were added, the mixture was heated to 60° C. with agitation and 1.1 g. (0.07% OWM) azobis-(isobutyramidine dihydrochloride) were added. The polymerization initiated and heating at 60° to 70° F. was continued until complete (4–5 hours). The resulting aqueous dispersion contained approximately 28% solids and was diluted with water to the required 25%.

Copolymer emulsion (b)

The polymerization was run at 60° C. for 6 hours with the following recipe added in the order shown:

|   | Parts |
|---|---|
| Water | 2200.0 |
| Dimethyloctadecylamine | 30.0 |
| Glacial acetic acid | 18.3 |
| $F(CF_2)_nCH_2CH_2O_2CC(CH_3)=CH_2$ | 750.0 |
| 2-ethylhexyl methacrylate | 250.0 |
| N-methylolacrylamide | 2.5 |
| 2-hydroxylethyl methacrylate | 2.5 |
| Acetone | 1000.0 |
| Azodiisobutyramidine dihydrochloride | 0.4 |

TABLE IV

| Exp. No. | Percent solvent perchloroethylene | Percent adjuvant isopropyl alcohol | Percent fluorinated polymer emulsion | Emulsion stability ½ hr. | 24 hrs. | 7 days |
|---|---|---|---|---|---|---|
| 21 | 67 | 12 | 21% copolymer emulsion a, 25% active ingredient polymer | Stable | Stable | Unstable. |
| 22 | 67 | 12 | 21% copolymer emulsion b, 14.3% active ingredient polymer | do | do | Do. |
| 23 | 67 | 12 | 21% polymer emulsion c, 14.3% active ingredient polymer | do | do | Do. |
| 24 | 67 | 12 | 21% polymer emulsion d, 15.5% active ingredient polymer | do | do | Stable. |
| 25 | 67 | 12 | 21% polymer emulsion e, 13.4% active ingredient polymer | do | Unstable | Do. |
| 26 | 67 | 12 | 21% polymer emulsion f, 14.3% active ingredient polymer | do | do | Do. |

Copolymer emulsion (a)

An aqueous emulsion containing 21% of the copolymer made by polymerizing the monomer mixture containing:

65 parts $C_nF_{2n+1}CH_2CH_2O_2CC(CH_3)=CH_2$ where $n=4$ to 14
35 parts lauryl methacrylate
0.25 part 2-hydroxyethyl methacrylate
0.25 part n-methylol acrylamide The polymerization was carried out as follows:
Dimethyl di(hydrogenated tallow)ammonium chloride (Aliquat H226-General Mills) (6.25 g., 0.45% on A non-fluorinated extender polymer was prepared by polymerizing at 70° C. for four hours, the following recipe added in the order shown:

|   | Parts |
|---|---|
| Water | 2200.0 |
| Dimethyloctadecylamine | 20.0 |
| Glacial acetic acid | 12.2 |
| 2-ethylhexyl methacrylate | 950.0 |
| N-methylolacrylamide | 18.0 |
| Ethylene dimethacrylate | 5.0 |
| Acetone | 237.0 |
| Sodium chloride | 0.7 |
| Azobisisobutyramidine dihydrochloride | 0.222 |

The product was an emulsion of the polymer in water.

The two polymers were mixed to give a polymer mix containing 57.7% of fluorine containing polymer and 42.3% of non-fluorine containing polymer, with a total solids content of 14.3%.

Polymer emulsion (c)

This emulsion was the same as copolymer emulsion (b) but with the addition of 1.5% of the polymer weight of

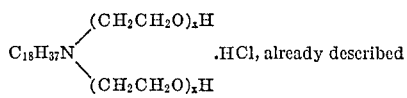
.HCl, already described

Polymer emulsion (d)

This emulsion contained 15.53% active ingredient solids of which 61.4% were those of copolymer emulsion (a) above, and 38.6% were those of a non-fluorinated polymer emulsion prepared as follows at 70° C. for four hours with the following recipe added in the order shown:

|  | Parts |
|---|---|
| Water | 2200.0 |
| Dimethyloctadecylamine | 20.0 |
| Glacial acetic acid | 12.2 |
| 2-ethylhexyl methacrylate | 950.0 |
| N-methylolacrylamide | 18.0 |
| Ethylene dimethacrylate | 5.0 |
| Acetone | 237.0 |
| Sodium chloride | 0.7 |
| Azobisisobutyramidine dihydrochloride | 0.222 |

The product was an emulsion of the polymer in water.

Polymer emulsion (e)

This emulsion contained 13.4% active ingredients of which about 66.4% were those of copolymer (b), about 33.2% were those of the non-fluorinated polymer of polymer emulsion (d), and the remainder

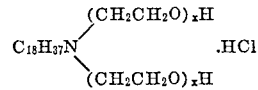
.HCl

Polymer emulsion (f)

This emulsion contained 14.3% active ingredient solids of which about 57.8% were those of copolymer emulsion (b), and about 42.2% those of the emulsion prepared as follows:

The aqueous emulsion polymerization was run at 70° C. for four hours, using the following recipe added in the order shown:

|  | Parts |
|---|---|
| Demineralized water | 2200 |
| Octadecyldimethylamine | 20 |
| Acetic acid | 12.2 |
| 2-ethylhexyl methacrylate | 1000 |
| Acetone | 237 |
| Sodium chloride | 0.7 |
| 60% N-methylolacrylamide | 18 |
| Azo bis(isobutyramidine) dihydrochloride | 0.222 |

Approximately a 30% emulsion of a polymer containing 98% 2-ethylhexyl methacrylate and 2% N-methylolacrylamide results.

EXAMPLES 27-30

The following experiments (Table V) were performed in the same manner using the same ingredients as in experiments 21-26 except for the substitution of the fluoropolymer emulsions described.

TABLE V

| Exp. No. | Percent solvent perchloroethylene | Percent adjuvant isopropyl alcohol | Percent fluorinated polymer emulsion | Emulsion stability ½ hr. | 24 hrs. | 7 days |
|---|---|---|---|---|---|---|
| 27 | 67 | 12 | 21% copolymer emulsion g, 30% active ingredient polymer | Stable | Unstable | Unstable. |
| 28 | 67 | 12 | 13% copolymer emulsion g, 30% active ingredient polymer | do | Stable | Stable. |
| 29 | 67 | 12 | 21% copolymer emulsion h, 30% active ingredient polymer | do | Unstable | Unstable. |
| 30 | 67 | 12 | 13% copolymer emulsion h; 30% active ingredient polymer | do | Stable | Do. |

Examples 28 and 30 contained, in addition to the fluorinated copolymer emulsion described, 8% of the 29% active ingredient non-fluorinated polymer emulsion of 98% 2-ethylhexylmethacrylate and 2% N-methylolacrylamide.

Copolymer emulsion (g) is "Scotchgard" FC 208, produced by Minnesota Mining and Mfg. Co., and is believed to be the copolymer emulsion derived from polymerization of a monomer mixture containing about

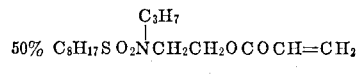

and

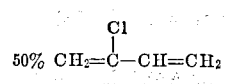

The product is an aqueous emulsion of about 30% solids and is thought to be prepared essentially as described in Ex. VIII part B of U.S. Pat. 3,068,187 (British equivalent 904,262) but with chloroprene substituted for butadiene.

Copolymer emulsion (h) is "Scotchgard" FC 210, produced by Minnesota Mining and Mfg. Co., and is believed to be the copolymer emulsion derived from polymerization of a monomer mixture containing about

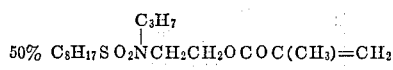

and

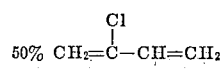

The product is an aqueous emulsion of about 30% solids and is thought to be prepared substantially as described in Example 9 of U.S. Pat. 2,803,615 (British equivalent 587,687) but with chloroprene substituted for butadiene.

EXAMPLES 31-36

In the following Examples 31-36 a number of solvents were tested in the same manner as described for Examples 7-15. Results are shown in Table VI.

TABLE VI

| Exp. No. | Solvent | Percent adjuvant isopropyl alcohol | Percent extender polymer emulsion non-fluorinated | Percent fluorinated polymer emulsion | Emulsion stability ¼ hr. | 24 hrs. | 7 days |
|---|---|---|---|---|---|---|---|
| 31 | 65% trichloroethylene (1,1,2). | 12.8 | 9.0 | 13.2 | Stable | Stable | Stable. |
| 32 | 62.6% methyl chloroform | 13.7 | 9.5 | 14.2 | do | do | Do. |
| 33 | 67% CCl₂F—CCl₂F | 12.0 | 8.0 | 13.0 | do | Unstable | Unstable. |
| 34 | 67% CCl₂F—CCl₂F₂ | 12.0 | 8.0 | 13.0 | do | do | Do. |
| 35 | 67% methylene chloride | 12.0 | 8.0 | 13.0 | do | Stable | Do. |
| 36 | 67% carbon tetrachloride | 12.0 | 8.0 | 13.0 | do | do | Do. |

EXAMPLES 37–56

A number of the emulsion compositions prepared in the previous examples were employed in treating samples of four different types of textiles, and the treated cloth tested for water repellency and oil repellency as already described.

For Examples 37–59, treating baths were prepared containing 95% perchloroethylene and 5% of the concentrated emulsion composition to be tested. The emulsion composition was poured into the perchloroethylene at room temperature with gentle stirring. Thin stable emulsions resulted in all cases. Square pieces of cloth 6" x 18" were dipped into the thin emulsion, then removed and drained to desired pickup of cloth weight.

Pickup and draining time for the different fabrics were as follows:

| Cloth | Wet pickup percent | Draining time, secs. |
|---|---|---|
| Polyester/cotton | 115 | 15 |
| Wool | 167 | 30 |
| Cotton | 150 | 15 |
| Polyester | 230 | 15 |

The samples were tumble dried in a Cissell dryer at about 140° F. for 5 to 10 minutes, then removed and allowed to cool before testing for water and oil repellency. Water Repellency Test was the A.A.T.C.C. Spray Test 22–1967, and Oil Repellency Test was A.A.T.C.C. Test 118–1966. Results of these tests are shown in Table VII, Examples 37–59. The tests cloths of these examples were not laundered or dry cleaned before testing.

It will also be noted that in Example 37–59 the treated cloth samples were merely dried at 140° F. (60° C.), while in the tests of Example 2 (Table I), the treated cloth samples were cured at 150° C.

TABLE VII

| Exp. No. | Emulsion from Ex. No. | Water repellency/oil repellency | | | |
|---|---|---|---|---|---|
| | | 65/35 polyester/ cotton outerwear | 100% wool | 100% cotton poplin | 100% polyester |
| 37 | 10 | 90/2 | 100/6 | 80/2 | 100/3 |
| 38 | 16 | 80/2 | 100/6 | 90/2 | 100/4 |
| 39 | 17 | 80/3 | 100/7 | 90/6 | 100/5 |
| 40 | 18 | 80/2 | 100/7 | 90/6 | 100/5 |
| 41 | 19 | 80/2 | 100/6-7 | 80/2 | 80/4 |
| 42 | 20 | 80/1 | 100/6 | 80/1 | 100/3 |
| 43 | 21 | 90/3 | 100/6 | 80/5 | 100/5 |
| 44 | 22 | 80/1 | 100/6 | 80/1 | 100/1 |
| 45 | 23 | 70/1 | 100/6 | 90/1 | 100/5 |
| 46 | 24 | 90/2 | 100/7 | 90/4 | 100/5 |
| 47 | 25 | 0/0 | 70/2 | 0/0 | 70/0 |
| 48 | 26 | 90/0 | 90/7 | 80/1 | 100/2 |
| 49 | 28 | 80/2 | 100/6 | 80/6 | 90/6 |
| 50 | 30 | 80/2 | 80/6 | 80/5 | 80/6 |
| 51 | 31 | 80/2 | 80/6 | 70/2 | 100/4 |
| 52 | 32 | 80/1 | 100/6 | 80/2 | 100/4 |
| 53 | 33 | 90/3-4 | 100/7 | 90/2 | 100/5 |
| 54 | 34 | 90/3-4 | 100/6 | 100/2 | 100/5 |
| 55 | 35 | 80/1 | 100/6 | 80/2 | 100/5 |
| 56 | 36 | 80/2 | 100/7 | 90/7 | 100/5 |

Examples 57 and 58 were performed to show the repellency obtained by treatment of textiles with aqueous suspensions of oil and water repellents followed by drying at 140° F. on one hand and curing at 340° F. on the other. The treatment was made using the aqueous emulsion (f) of Example 26 which had 14.3% active ingredient. The cloth samples were dipped in the emulsion, then squeezed between rollers to provide a pickup of 2% to 4% of the emulsion on the dry cloth weight as shown in Table VIII. It is seen that 140° F. drying of the so-treated textiles gives inferior repellency to that provided by treatment with the compositions of this invention.

In Example 48 a composition of the invention was used to treat cloth samples with drying at 60° C. In Example 57 the same repellent as used in Example 48 was applied from an aqueous emulsion followed by drying at 60° C. Comparison of the repellency reveals the superior performance of the compositions of this invention.

TABLE VIII

| Exp. No. | 65/35 polyester/ cotton, 2.0% polymer emulsion | 100% wool 2.8% polymer emulsion | 100% cotton 2.5% polymer emulsion | 100% polyester 4.0% polymer emulsion |
|---|---|---|---|---|
| 57 (140° F., 3 min.) | 70/0 | 70/0 | 50/0 | 70/3 |
| 58 (340° F., 3 min.) | 100/5 | 90/7 | 70/5 | 100/7 |

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

What we claim is:

1. A composition which is in the form of an emulsion or which can readily be converted into an emulsion on shaking, suitable for imparting oil and/or water repellency to substrates which composition consists essentially of from 0.01 to 30% by weight of a solid fluorine-containing polymer wherein said fluorine is contained in pendant perfluoroalkyl groups and having oil and/or water repellency properties, from 50% to 99.97% by weight of a halogenated solvent which is perchloroethylene, trichloroethylene, 1,1,2 - trichloro - 1,2,2 - trifluoroethane, carbon tetrachloride, methylene chloride, methyl chloroform, monochlorobenzene, orthodichlorobenzene, 1,1,2,2-tetrachloro - 1,2 - difluoroethane or 1,1,1 - trichloro-2,2,3,3,3 - pentafluoropropane; from 0.01 to 49% by weight of an alkanol of 1 to 5 carbon atoms, and from 0.01 to 30% by weight of water.

2. A composition according to claim 1 wherein the fluorine-containing polymer is a homo- or co-polymer of a monomer having the formula:

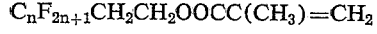

$$C_nF_{2n+1}CH_2CH_2OOCC(CH_3)=CH_2$$

3. A composition according to claim 2 wherein the fluorine-containing polymer is a copolymer containing from 3% to 95% by weight of units of a monomer as defined in claim 2 and, correspondingly, from 97% to 5% by weights of units of at least one polymerizable vinyl compound free of non-vinylic fluorine atoms.

4. A composition according to claim 3, which also contains a non-fluorine containing polymer of at least one monovinyl compound free of non-vinylic fluorine atoms, or a non-fluorinated conjugated diene.

5. A composition according to claim 4 wherein the non-fluorine containing polymer is a polymer of an alkyl methacrylate.

6. A composition according to claim 4 wherein the polymer mixture contains from 3 to 60% by weight of units of the fluorine-containing monomer.

7. A composition according to claim 1 wherein the fluorine-containing polymer is a homopolymer, an acrylate ester of the formula:

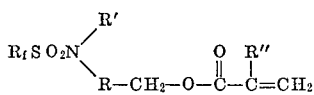

in which $R_f$ is a perfluoroalkyl radical of 4 to 12 carbon atoms, R is an alkylene radical of 1 to 12 carbon atoms, R' is an alkyl group of 1 to 6 carbon atoms and R" is hydrogen or a methyl group, or a copolymer of a said acrylate ester and an ethylenically unsaturated monomer.

8. A composition according to claim 4 wherein the non-fluorine containing polymer is a polymer of an alkyl methacrylate and N-methylol acrylamide.

References Cited

UNITED STATES PATENTS

| | | | |
|---|---|---|---|
| 2,803,615 | 8/1957 | Ahlbrecht et al. | 260—29.6 F |
| 3,378,609 | 4/1968 | Fasick et al. | 260—29.6 F |
| 3,154,506 | 10/1964 | Janssens | 260—29.6 F |
| 2,510,112 | 6/1950 | Holbrook | 260—29.6 F |

FOREIGN PATENTS

| | | | |
|---|---|---|---|
| 40-8139 | 4/1965 | Japan | 260—29.6 F |
| 6614939 | 4/1967 | Netherlands | 260—29.6 F |

HAROLD D. ANDERSON, Primary Examiner

U.S. Cl. X.R.

117—138.8 UF, 145, 161 UZ; 260—29.6 RW, 29.6 TA, 29.7 R, 29.7 UA

PO-1050
(5/69)

UNITED STATES PATENT OFFICE
CERTIFICATE OF CORRECTION

Patent No. 3,657,173      Dated April 18, 1972

Inventor(s) Albert R. Eanzel and John Preston

It is certified that error appears in the above-identified patent and that said Letters Patent are hereby corrected as shown below:

Column 2, line 57, the formula should read
-- $C_nF_{2n+1}CH_2CH_2O_2CC(CH_3)=CH_2$ --. Column 3, line 3, the word "isoaryl" should be -- isoamyl --; line 8, the words "ally caproate" should be -- allylcaproate --; line 14, the word "anl" should be -- and --; line 20, the word "conjugatel" should be -- conjugated --; line 68, the word "above-describel" should be -- above-described --. Column 5, line 66, the word "textile" should be -- Textile --. Column 6, line 1 the term "1-6;6" should be -- 1-10;10 --; line 31, the formula should read -- $CH_2=C(CH_3)CO_2CH_2CH_2(CF_2)_nF$ --. Column 9 in Example 18 the adjuvant should be -- n-amyl alcohol --. Column 12, line 37, the formula should be $$-- C_8F_{17}SO_2\underset{\underset{C_3H_7}{|}}{N}CH_2CH_2OCOCH=CH_2 --;$$

line 57, the formula should read $$-- C_8F_{17}SO_2\underset{\underset{C_3H_7}{|}}{N}CH_2CH_2OCOC(CH_3)=CH_2 --.$$

In Claim 2, after the formula, a line should be added -- in which n is an integer from 3 to 14 --. In Claim 7, line 2, after "homopolymer" the comma "," should be -- of --.

Signed and sealed this 30th day of January 1973.

(SEAL)
Attest:

EDWARD M. FLETCHER, JR.           ROBERT GOTTSCHALK
Attesting Officer                    Commissioner of Patents